(12) United States Patent
Stokes, III et al.

(10) Patent No.: US 8,275,120 B2
(45) Date of Patent: Sep. 25, 2012

(54) ADAPTIVE ACOUSTIC ECHO CANCELLATION

(75) Inventors: Jack W. Stokes, III, North Bend, WA (US); Dinei Florencio, Redmond, WA (US); Amit Chhetri, Tempe, AZ (US)

(73) Assignee: Microsoft Corp., Redmond, WA (US)

( * ) Notice: Subject to any disclaimer, the term of this patent is extended or adjusted under 35 U.S.C. 154(b) by 1639 days.

(21) Appl. No.: 11/421,052

(22) Filed: May 30, 2006

(65) Prior Publication Data
US 2007/0280472 A1   Dec. 6, 2007

(51) Int. Cl.
*H04M 9/08* (2006.01)
(52) U.S. Cl. .................................. 379/406.08; 379/392
(58) Field of Classification Search ............ 379/406.01–406.16, 3, 391, 392, 406, 382; 381/66, 83, 381/93, 95, 96; 455/570; 370/286
See application file for complete search history.

(56) References Cited

U.S. PATENT DOCUMENTS

| | | | |
|---|---|---|---|
| 4,038,536 A * | 7/1977 | Feintuch ..................... | 708/322 |
| 5,117,418 A * | 5/1992 | Chaffee et al. ............... | 370/289 |
| 5,272,695 A | 12/1993 | Makino et al. | |
| 5,859,914 A | 1/1999 | Ono et al. | |
| 6,282,286 B1 | 8/2001 | Reesor et al. | |
| 6,442,274 B1 | 8/2002 | Sugiyama | |
| 6,532,289 B1 | 3/2003 | Magid | |
| 6,687,723 B1 | 2/2004 | Ding | |
| 6,766,019 B1 | 7/2004 | Benesty et al. | |
| 6,885,750 B2 * | 4/2005 | Egelmeers et al. ............. | 381/66 |
| 6,925,176 B2 | 8/2005 | Myllyla et al. | |
| 6,947,550 B2 | 9/2005 | Xiong | |
| 6,961,422 B2 | 11/2005 | Boland | |
| 6,996,241 B2 | 2/2006 | Ray et al. | |
| 6,999,509 B2 | 2/2006 | Awad et al. | |
| 7,747,001 B2 * | 6/2010 | Kellermann et al. ..... | 379/406.01 |
| 2004/0076288 A1 | 4/2004 | Cairns | |
| 2004/0131197 A1 | 7/2004 | Le Tourneur et al. | |
| 2004/0162866 A1 * | 8/2004 | Malvar ......................... | 708/404 |
| 2004/0170271 A1 | 9/2004 | Kubota | |
| 2005/0147230 A1 * | 7/2005 | Bershad et al. .......... | 379/390.02 |
| 2006/0147032 A1 * | 7/2006 | McCree et al. .......... | 379/406.08 |

OTHER PUBLICATIONS

European Search Report, Application No. EP07774946.3, completed Jun. 26, 2009, received Jul. 7, 2009.
Apolinario Jr., J., R. Alves, P. Diniz, M. Swamy, Filtered gradient algorithms applied to a subband adaptive filter structure, IEEE Int'l Conference on Acoustics Speech and Signal Processing, 2001, vol. 6, pp. 3706-3708.
Benesty J., D. Morgan, M. Sondhi, A better understanding and an improved solution to the problems of stereophonic acoustic echo cancellation, IEEE Int'l Conference on Acoustics, Speech, and Signal Processing (ICASSP'97), 1997, vol. 1, pp. 303-306.
Breining, C., P. Dreiseitel, E. Hansler, A. Mader, B. Nitsch, H. Puder, T. Schertler, G. Schmidt, J. Tilp, Acoustic echo control: An application of very-high-order adaptive filters, IEEE Signal Processing Magazine, 1999, pp. 42-69.

(Continued)

*Primary Examiner* — MD S Elahee
*Assistant Examiner* — Akelaw Teshale
(74) *Attorney, Agent, or Firm* — Lyon & Harr, LLP; Katrina A. Lyon

(57) ABSTRACT

An acoustic echo cancellation technique. The present adaptive acoustic echo cancellation technique employs a plurality of acoustic echo cancellation filters which use different adaptation techniques which may employ different parameters such as step size, to improve both the adaptation algorithm convergence time and misadjustment over previously known acoustic echo cancellation techniques.

20 Claims, 10 Drawing Sheets

OTHER PUBLICATIONS

Im, S., A normalized block LMS algorithm for frequency-domain volterra filters, Proceedings for the 1997 IEEE Signal Processing Workshop on Higher-Order Statistics, 1997, pp. 152-156.

Jeannes, W.L.B., P. Scalart, G. Faucon, C. Beaugeant, Combined noise and echo reduction in hands-free systems: A survey, IEEE Transactions on Speech and Audio Processing, 2001, vol. 9, No. 8, pp. 808-820.

Ochiai, K., T. Araseki, T. Ogihara, Echo canceller with two echo path models, IEEE Transactions on Communications, 1977, vol. 25, No. 6, pp. 589-595.

Proakis, J. G., Channel identification for high speed digital communications, IEEE Trans. Automat. Control, Dec. 1974, vol. 19, pp. 916-922.

Roy, S., J. J., Shynk, Analysis of the momentum LMS algorithm, IEEE Trans/ ASSP, 1990, pp. 2088-2098.

Ye, H., and B. Wu, A new double-talk detection algorithm based on the orthogonality theorem, IEEE Trans. Communications, 1991, vol. 39, pp. 1542-1545.

\* cited by examiner

ADAPTIVE ACOUSTIC ECHO CANCELLATION

BACKGROUND

Acoustic echo cancellation removes the echo captured by a microphone when a sound is simultaneously played through speakers located near the microphone. Many high noise environments such as noisy conference rooms or lobbies and hands-free telephony in cars require effective echo cancellation for enhanced communication. However, the presence of noise impedes the convergence of acoustic echo cancellation algorithms, which leads to poor echo cancellation.

In echo cancellation, complex algorithmic procedures are used to compute speech echo models. This involves generating the sum from reflected echoes of the original speech and then subtracting this from any signal the microphone picks up. The result is the purified speech of the person talking. The format of this echo prediction must be learned by an echo canceller in a process known as adaptation. The parameters learned from the adaptation process generate the prediction of the echo signal, which then forms an acoustic picture of the room in which the microphone is located.

The performance of an adaptive filtering algorithm can be evaluated based on its convergence rate and a factor known as misadjustment. The rate of convergence can be defined as the number of iterations required for the algorithm, under stationary conditions, to converge "close enough" to an optimum Wiener solution in the mean-square sense. Misadjustment describes the steady-state behavior of the algorithm, and is a quantitative measure of the amount by which the averaged final value of the mean-squared error exceeds the minimum mean-squared error produced by an optimal Wiener filter. A well known property of adaptive filtering algorithms is the trade-off between adaptation time and misadjustment. An effective acoustic echo canceller requires fast adaptation when the echo path changes and smooth adaptation when the echo path is stationary.

In many acoustic echo cancellation algorithms, an adaptive filter learns the transfer function of the near-end room, the part of the room nearest the microphone, using a normalized, least mean square (NLMS) algorithm. The NLMS algorithm is the most widely used algorithm in acoustic echo cancellation and it provides a low cost way to determine the optimum adaptive filter coefficients. The algorithm minimizes the mean square of the residual echo error signal at each adaptation step (e.g., at each sample), hence the name of the algorithm. Normalization by signal power is typically used because speech is a highly non-stationary process. NLMS updates the adaptive filter coefficients depending upon the error signal from the unprocessed microphone signal and the echo predicted by the current adaptive filter. In high noise environments, this error is increased by the uncorrelated noise which causes the adaptive filter coefficients to move away from the optimal solution.

Previous works in acoustic echo cancellation in high noise focused on combined noise and echo reduction. One of the approaches is to preprocess the microphone signal through a noise suppression algorithm and perform adaptation using the far-end speaker signal that has undergone the same noise suppression operations as the microphone signal. Although this seems favorable, experiments revealed that this technique often distorts the echo signal, which hinders the convergence properties of the acoustic echo cancellation algorithm. Furthermore, this technique requires perfect synchronization between the microphone and the far-end speaker signals, which is often difficult to attain.

Various post processing techniques used to remove echoes also result in noticeable distortion of the near-end speech captured by the microphone.

SUMMARY

The present adaptive acoustic echo cancellation technique adapts to different noise environments by employing a plurality of acoustic echo cancellation filters which use different adaptation techniques to improve both the convergence time and misadjustment over previously known acoustic echo cancellation techniques. This is especially true with respect to high noise environments.

In general, one embodiment of the present adaptive acoustic echo cancellation technique operates as follows. A frame of playback data (speaker data) and a corresponding frame of capture data (data captured by the microphone), are received. The playback data and corresponding capture data are converted in to the frequency domain using any appropriate transformation such as, for example, the conventional Fast Fourier Transform (FFT) or the Modulated Complex Lapped Transform (MCLT). The frequency domain playback and capture data are then processed by a number of adaptive acoustic echo cancellation filters which use different adaptation techniques, and which may also use different parameters such as step size, to cancel the echo in the frequency domain. The acoustic echo cancellation (AEC) outputs can then be combined to form a final AEC output in the frequency domain. Optionally, this final AEC output can be converted back to the time domain by an inverse frequency domain transform.

In another exemplary embodiment, a loudspeaker signal (playback data) and corresponding microphone signal (capture data) are received and converted into a frequency domain signal by computing a MCLT, FFT, filter bank, or any other transform that improves the convergence property of the acoustic echo cancellation. For each frequency, a number of acoustic echo cancellation filters, say K filters, are computed, each using different parameters of different adaptation techniques (i.e., AEC 1 though AEC K). For each frequency, a linear combination of the outputs of the K filters is computed. The linear combination of the K filter outputs for each frequency are then combined for all of the frequencies and, optionally, the result is converted back into the time domain.

In yet another exemplary embodiment of the adaptive acoustic echo cancellation technique, a dual-structured acoustic echo cancellation architecture is employed where one part of the architecture performs fast adaptation, while the other part performs smooth adaptation. A momentum normalized least mean squares (MNLMS) algorithm is used to provide smooth adaptation and fast adaptation is preferably performed using a conventional normalized least mean squares (NLMS) algorithm (although other fast adaptation algorithms could be used). Due to its smoothing nature, the MNLMS acoustic echo cancellation algorithm works wells when nothing in the near end room is moving very much, but converges much more slowly than a NLMS algorithm in a dynamic environment. As a result, on one branch of the architecture, NLMS acoustic echo cancellation is used for fast adaptation, such as, for example, during the initial period when the acoustic echo cancellation parameters are being trained and also when someone moves in the near-end room. On the second branch, the present adaptive dual-structured acoustic echo cancellation architecture uses the MNLMS acoustic echo cancellation algorithm for periods when smooth adaptation is desired, such as for example, when there are no major movements in the near-end room. A convergence detector is used to detect when to switch between the fast branch and the slow branch of the dual-structured architecture.

It is noted that while the foregoing limitations in existing echo cancellation techniques described in the Background section can be resolved by a particular implementation of the adaptive acoustic echo cancellation technique described, this technique is in no way limited to implementations that just solve any or all of the noted disadvantages. Rather, the present technique has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The specific features, aspects, and advantages of the claimed subject matter will become better understood with regard to the following description, appended claims, and accompanying drawings where:

DETAILED DESCRIPTION

In the following description, reference is made to the accompanying drawings that form a part hereof, and in which is shown by way of illustration specific embodiments in which the invention may be practiced. It is understood that other embodiments may be utilized and structural changes may be made without departing from the scope of the present disclosure.

1.0 The Computing Environment.

Before providing a description of embodiments of the present adaptive acoustic echo cancellation technique, a brief general description of a suitable computing environment in which portions of the technique may be implemented will be described. The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
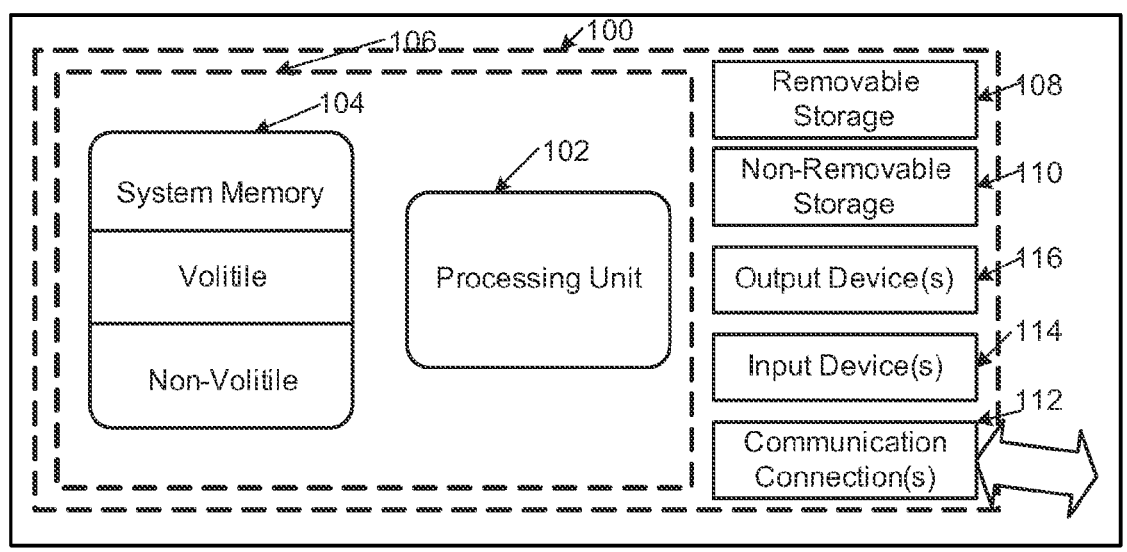
FIG. 1 is a diagram depicting a general purpose computing device constituting an exemplary system for implementing the present adaptive acoustic echo cancellation technique.

FIG. 1 illustrates an example of a suitable computing system environment. The computing system environment is only one example of a suitable computing environment and is not intended to suggest any limitation as to the scope of use or functionality of the present systems and process. Neither should the computing environment be interpreted as having any dependency or requirement relating to any one or combination of components illustrated in the exemplary operating environment. With reference to FIG. 1, an exemplary system for implementing the present process includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, camera, pen, voice input device, touch input device, speaker signal, etc. in particular, one such input device is a microphone. Output device(s) 116 such as a display, speakers, printer, etc. may also be included. All these devices are well know in the art and need not be discussed at length here.

The present technique may be described in the general context of computer-executable instructions, such as program modules, being executed by a computing device. Generally, program modules include routines, programs, objects, components, data structures, and so on that perform particular tasks or implement particular abstract data types. The process may also be practiced in distributed computing environments where tasks are performed by remote processing devices that are linked through a communications network. In a distributed computing environment program modules may be located in both local and remote computer storage media including memory storage devices.

The exemplary operating environment having now been discussed, the remaining parts of this description section will be devoted to a description of the program modules embodying the present adaptive acoustic echo cancellation technique.

2.0 Adaptive Acoustic Echo Cancellation Technique.

The following sections of this description provide a general description of the acoustic echo cancellation problem descriptions of various embodiments of the present adaptive acoustic echo cancellation technique as well as a description of the Normalized Least Mean Squares (NLMS) algorithm, and the Momentum Normalized Least Mean Squares (MNLMS) algorithm which can be employed in the adaptive acoustic echo cancellation technique.

2.1 The Acoustic Echo Cancellation Problem.

Figure 2:
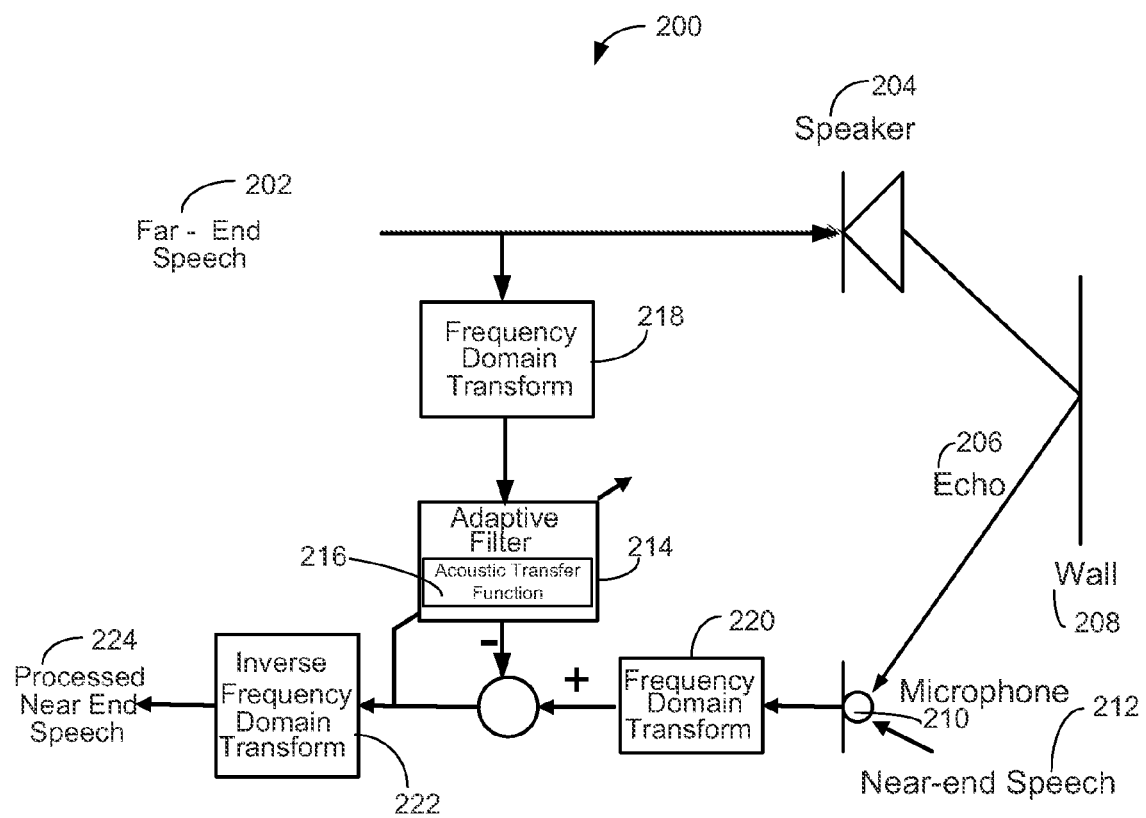
FIG. 2 depicts a diagram defining the general high level system acoustic echo cancellation problem.

A typical system level acoustic echo cancellation 200 system is shown in FIG. 2. Far-end speech 202, speech that is away from a microphone 210, is played through one or more speakers 204. This far-end speech 202 creates an echo 206 when it bounces off the walls 208, table, laptops, and so on, which is then captured by a microphone 210 in the near-end room (the part of the room closest to the microphone). In addition to the echo 206, the microphone also captures near-end speech 212 from one or more people speaking in the near-end of the room, as well as independent background noise. The goal of any acoustic echo cancellation algorithm is to estimate or predict the echo and then subtract the echo estimate from the raw microphone signal to produce a processed microphone signal which contains little or no echo. A typical acoustic echo cancellation algorithm uses an adaptive filter 214 to learn the acoustic transfer function 216 from the speaker(s) 204 to the microphone 210 in order to estimate the echo 206. Since the acoustic transfer function 216 can often span hundreds of milliseconds, thousands of parameters must be learned by the adaptive filter 214. As a result, the adaptive filter 214 is often better implemented in the frequency domain requiring the playback signal (loudspeaker signal) and capture (microphone) signal to first be converted to the frequency domain using a frequency domain transform 218, 220. Afterwards, the processed capture signal with reduced echo 224 (the near end processed speech) is often converted back to the time domain using an inverse frequency domain transform 222. It should be noted, however, that the actual acoustic echo cancellation can also be performed in the time domain. In this case, the capture signal is not converted into the frequency domain, and only the adaptive filter output is converted from the frequency domain to the time domain. In this case the echo cancellation takes place in the time domain.

2.2 Adaptive Acoustic Echo Cancellation Embodiments.

The present adaptive acoustic echo cancellation technique employs a plurality of acoustic echo cancellation filters which use different adaptation techniques, sometimes with different parameters, to provide optimum convergence speed and accuracy (minimum misadjustment) of the acoustic echo cancellation processing.

Figure 3:
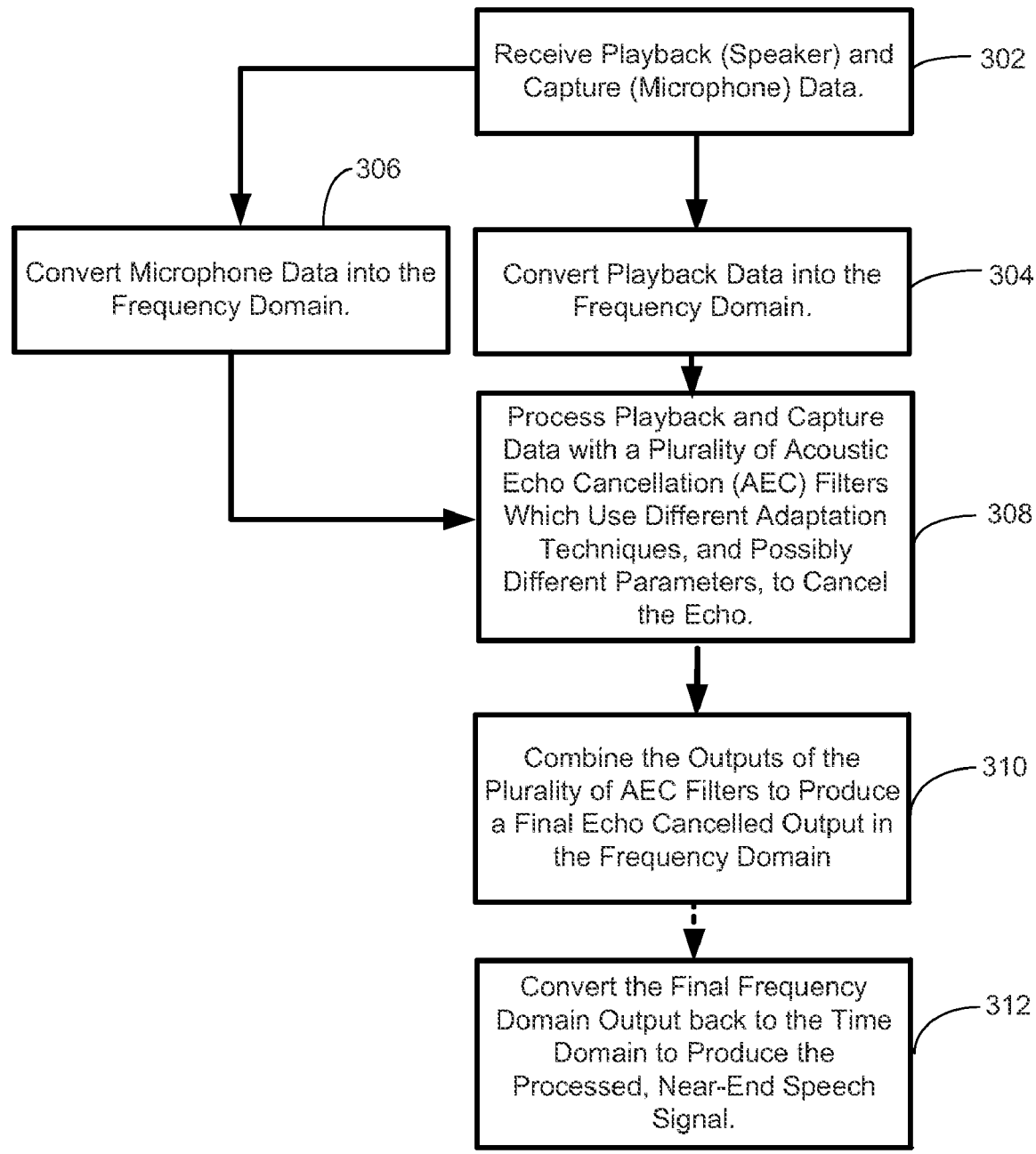
FIG. 3 depicts a high level flow diagram of one embodiment of the present adaptive acoustic echo cancellation technique.

A high level flow diagram of one embodiment of the present adaptive acoustic echo cancellation process is shown in FIG. 3. First, a new frame of playback data (speaker data) and a corresponding frame of capture data (data captured by the microphone) are received, as shown in process action 302. The playback/speaker data is then converted into the frequency domain using a transformation such as, for example, the Fast Fourier Transform (FFT) or the Modulated Complex Lapped Transform (MCLT) (process action 304). The microphone/capture data is also converted into the frequency domain using a transformation such as, for example, the Fast Fourier Transform (FFT) or the Modulated Complex Lapped Transform (MCLT) (process action 306). These frequency domain frames are then processed by a plurality of acoustic echo cancellation filters which use different adaptation techniques, e.g., Least Mean Squares (LMS), Normalized Least Mean Squares (NLMS), Momentum Normalized Least Mean Squares (MNLMS), Recursive Least Squares (RLS), Fast Recursive Least Squares (FRLS) to create a separate echo cancelled output in the frequency domain, as shown in process action 308. The different adaptation techniques can also use different parameters, such as step size, number of taps, regularization constant, forgetting factor, in attempting to achieve convergence of the adaptive filter algorithms. The frequency domain outputs of the plurality of AEC filters are then combined to produce a final echo cancelled, frequency domain output, as shown in process action 310. Optionally, the final frequency domain output is then converted back to the time domain to produce the processed, near-end speech signal 312.

Figure 4:
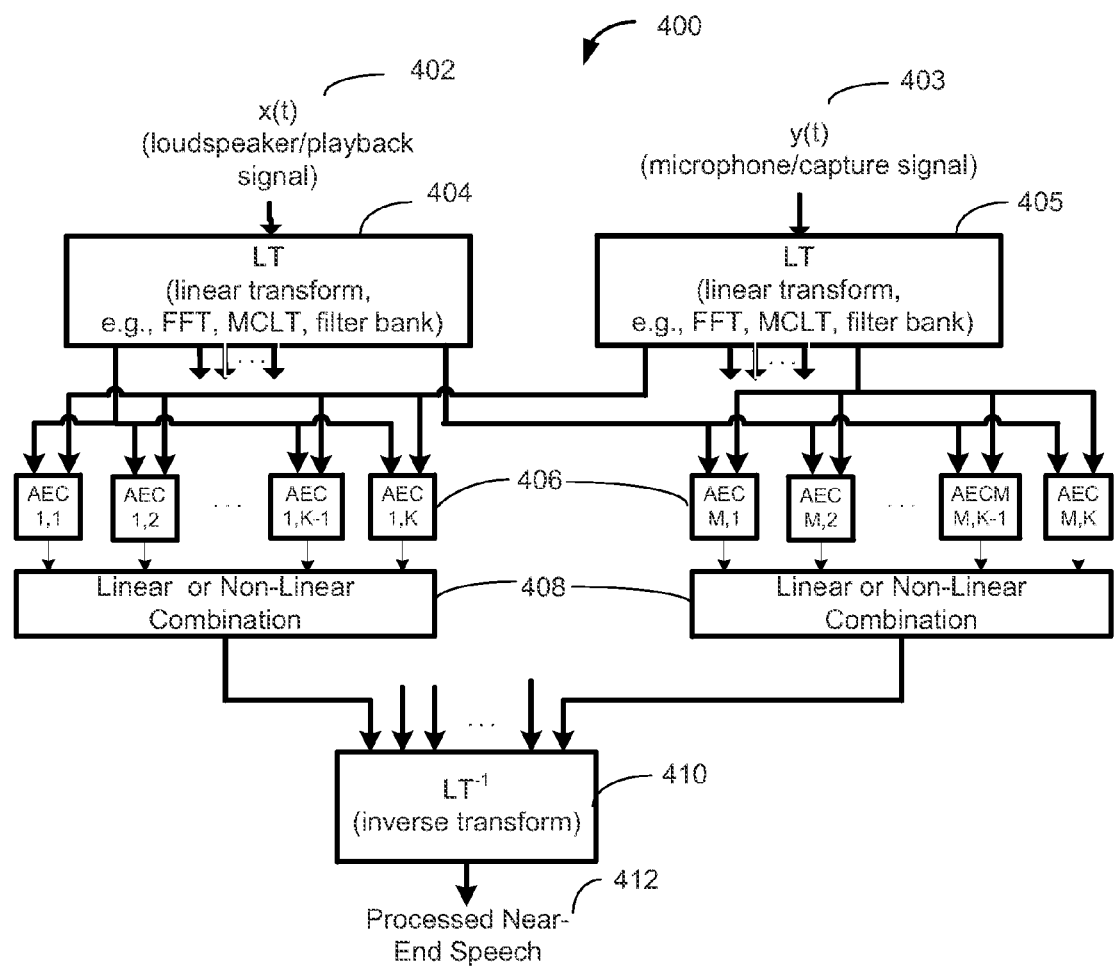
FIG. 4 depicts an exemplary system in which the adaptive acoustic echo cancellation process shown in FIG. 3 can be implemented.

An exemplary system 400 in which the adaptive acoustic echo cancellation process shown in FIG. 3 can be implemented is shown in FIG. 4. Here a loud speaker signal x(t) 402 is input into a linear transform module 404 which converts the loudspeaker signal x(t) which is originally in the time domain, into the frequency domain, for example by computing a FFT or MCLT, a filter bank, or any other transform that improves the convergence property of the acoustic echo cancellation algorithm. A microphone signal y(t) 403 is also input into a linear transform module 405 which converts the microphone signal y(t) which is originally in the time domain, into the frequency domain, for example by computing a FFT or MCLT, a filter bank, or any other transform that improves the convergence property of the acoustic echo cancellation algorithm. The loudspeaker and microphone signals which have been converted into the frequency domain are then input into adaptive filters 406. These M*K adaptive filters 406 use different adaptation techniques, possibly with different parameters, and output M*K corresponding resulting signals where M is the number of processed subbands and K is the number of different adaptation techniques per subband. It should be noted that the number of different adaptation techniques may vary for each subband. For each frequency subband m, a linear combination of these K outputs is computed in a linear (or non-linear) combination module 408. This can be done in a number of possible ways. For example, a linear combination can be performed by using:

$$\xi(m) = \sum_{k=1}^{K} \alpha_k(m)\xi_k(m) \quad (1)$$

where $\xi_k(m)$ is the output of the k-th acoustic echo cancellation (AEC) filter, at the frequency bin m, and $\alpha_k(m)$ is the corresponding gain for that filter. Typically, the sum of the gains over all k's adds up to one. A sample linear combination could be where the $\alpha_k$'s are inversely proportional to the energy of the echo residual, and such that they add up to one, i.e.:

$$\alpha_k(m) = \frac{R_k(m)}{\sum_{k=1}^{K} R_k(m)}, \quad (2)$$

where $R_k(m)$ is the inverse of the expected (or average) energy in band m for AEC filter k, i.e., $R_k(m)=1/E\{\xi_k(m)\}$, where $E\{\xi_k(m)\}$ denotes expected value. Once a linear combination of the K outputs is computed for each frequency band, the frequency domain output can be optionally converted back into the time domain in an inverse transform module 410 to produce the final processed near-end speech signal 412.

2.3 Dual-Structured Adaptive Acoustic Echo Cancellation.

The following sections describe a dual-structured acoustic echo cancellation technique, where one part employs fast adaptation and the other part employs smooth adaptation.

2.3.1 Fast and Smooth Adaptation.

Acoustic echo cancellation adaptation can be roughly divided into two phases: large, rapid changes are required to adapt to major acoustical changes (such as someone moving close to a microphone or speaker); smaller changes are required to adapt to minor perturbations or echo path changes (such as people located far away from the microphone or speaker making small movements). When an acoustic echo canceller is first operated in a room or other space, or is moved to a new location, it needs to adapt to the new acoustics of its surroundings. An acoustic echo canceller should approach this level of acoustical change quickly and unobtrusively by determining when it is in the receive state and adapting rapidly during that state. This is called fast adaptation. In response to smaller perturbations or echo path changes an acoustic echo canceller should smoothly and accurately adapt to these changes, minimizing the misadjustment. This is called smooth adaptation.

2.3.2 Dual-Structured Adaptive Acoustic Echo Cancellation Architecture.

Figure 5:
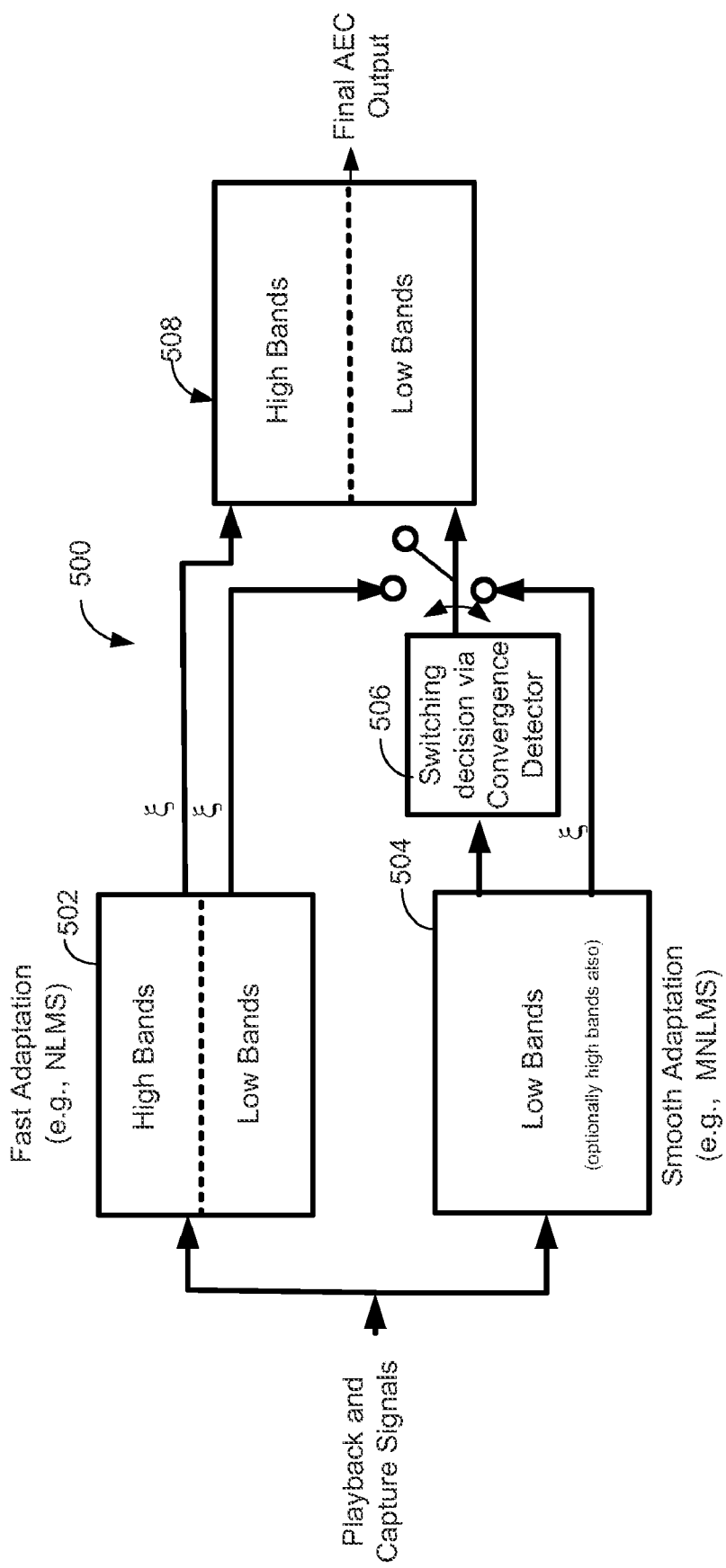
FIG. 5 depicts a dual-structured acoustic echo cancellation architecture in which one part performs fast adaptation, while the second part of the architecture performs smooth adaptation.

In another embodiment of the present adaptive acoustic echo cancellation system, shown in FIG. 5, a dual-structured acoustic echo cancellation architecture 500 is employed in which one part performs fast adaptation 502, while the second part 504 of the architecture performs smooth adaptation. At any given time a convergence detector 506 is used to decide which of the two parts 502, 504 should be used. In one version, a Normalized Least Mean Squares (NLMS) algorithm is used for fast adaptation, while a Momentum Normalized Least Mean Squares (MNLMS) algorithm is used for smooth adaptation. One embodiment of this architecture also processes high frequency bands differently from low frequency bands in order to optimize the speed and accuracy of the acoustic echo cancellation. Details of the NLMS and the MNLMS algorithms, and variations for high band and low band processing, are provided in the sections below.

2.3.2.1 Standard NLMS Filtering.

The NLMS algorithm is the most widely used algorithm in acoustic echo cancellation and it provides a low cost way to determine the optimum adaptive filter coefficients. The algorithm minimizes the mean square of the residual echo error signal at each adaptation step (e.g. at each input sample), hence the name of the algorithm. Normalization by the signal power is used to improve the estimate of the gradient which is used to update the adaptive filter coefficients. NLMS updates the adaptive filter coefficients depending upon the error signal from the unprocessed microphone signal and the echo cancelled by the current adaptive filter. In high noise environments, this error is increased by the uncorrelated noise which causes the adaptive filter coefficients to move away from the optimal solution.

A version of the NLMS algorithm with regularization, which implements the adaptive filter coefficient update in computing the fast adaptation acoustic echo cancellation output shown in FIG. 6, 604, may be computed as follows:

For each frame of audio data, n=1, 2, . . . , and each subband of the frequency band m=1 . . . M, compute $$\xi(m) = y(n, m) - \hat{w}^H(n, m) \times (n, m) \quad (3)$$

$$\hat{w}^H(n+1, m) = \hat{w}^H(n, m) + \frac{\mu}{P_{Est}(n, m) + \beta_{NLMS}} \times (n, m)\xi^*(m) \quad (4)$$

where $\xi$ is the error signal between the microphone signal, y(n,m), and the estimated echo, $\xi^*$ is the conjugate of the error signal, $$\hat{w}^H(n,m) = [\hat{w}^*(n,m,0)\hat{w}^*(n,m,1) \ldots \hat{w}^*(n,m,L-1)] \quad (5)$$

is the Hermitian transpose of the estimated echo filter coefficients in the transform domain, L is the number of taps in the estimated echo filter, $$x(n,m) = [x(n,m)x(n-1,m) \ldots x(n-L+1,m)]^T \quad (6)$$

is a column vector of the most recent L speaker samples, $\mu$ is the step size, $\beta_{NLMS}$ is a regularization factor, and $P_{Est}(n,m)$ is the estimate of the power in the $m^{th}$ band. For example, $P_{Est}(n,m)$ can be found as $$P_{Est}(n,m) = (1-\alpha)P_{Est}(n,m) + \alpha\|x(n,m)\|^2 \quad (7)$$

where $\|x(n,m)\|^2$ is the square of the magnitude of the complex speaker signal x(n,m) and $\alpha$ is an averaging parameter.

When dividing one number by a second number, regularization is the process of adding a small amount of noise to the denominator to ensure the denominator never becomes zero and causes the fraction to become infinite. In equation (4) $\beta_{NLMS}$ is the regularization factor that ensures that the denominator never goes to zero. An alternative way to regularize the fraction is to set the denominator to some threshold if the denominator as less than the threshold.

2.3.2.2 Momentum NLMS Filtering.

The momentum normalized least mean squares (MNLMS) algorithm restricts the adaptation process in order to reduce the adverse effects of the uncorrelated noise on the adaptive filter tap updates. Since the noise is typically random, but the location of the taps can be relatively stationary for reasonably long periods of time, the MNLMS acoustic echo cancellation puts more emphasis on the longer term tap update trajectory than on the short term fluctuations in the error signal due to near end noise.

A version of the MNLMS algorithm with regularization, which implements the adaptive filter coefficient is for smooth adaptive filtering shown in FIG. 5, 504, using the definitions provided for equations (5)-(7), can be described as:

For each frame of audio data, n=1, 2, ..., and each subband m=1 ... M, compute $$\xi(m) = y(n, m) - \hat{w}^H(n, m) \times (n, m) \tag{8}$$

$$\hat{w}^H(n+1, m) = \hat{w}^H(n, m) + \frac{\mu}{P_{Est}(n, m) + \beta_{NLMS}} \times (n, m)\xi^*(m) + \alpha[\hat{w}(n, m) - \hat{w}(n-1, m)] \tag{9}$$

The MNLMS algorithm corresponds to a second-order adaptive algorithm in that two previous weight vectors are combined at each iteration of the algorithm to obtain an updated weight vector. It can be seen that the last term of equation (9), the term $\alpha[\hat{w}(n,m)-\hat{w}(n-1,m)]$, represents the difference between equation (4) and equation (9). This term is known as the momentum term. If $\alpha$ is positive, the convergence speed is increased and the misadjustment error is also increased. A positive value for $\alpha$ could allow the MNLMS method to be used for the fast adaptation AEC technique. For the smooth adaptation AEC technique, a should be negative which decreases both the misadjustment error and the convergence time. With a negative value of $\alpha$, the effects of the independent near-end noise and the resulting error, $\xi(m)$, is reduced in the tap update in equation (9). It subtracts a fraction of the weight increment of the previous iteration thereby reducing the momentum of the adaptive process. The normalization term is $P_{Est}(n,m)+\beta_{NLMS}$.

2.3.3 Variations of the Dual-Structured Adaptive Echo Cancellation Technique.

The dual-structured adaptive echo cancellation embodiment shown in FIG. 5 car be modified to process low frequency bands and high frequencies bands differently and employ different step sizes in attempting to reach convergence.

Figure 6:
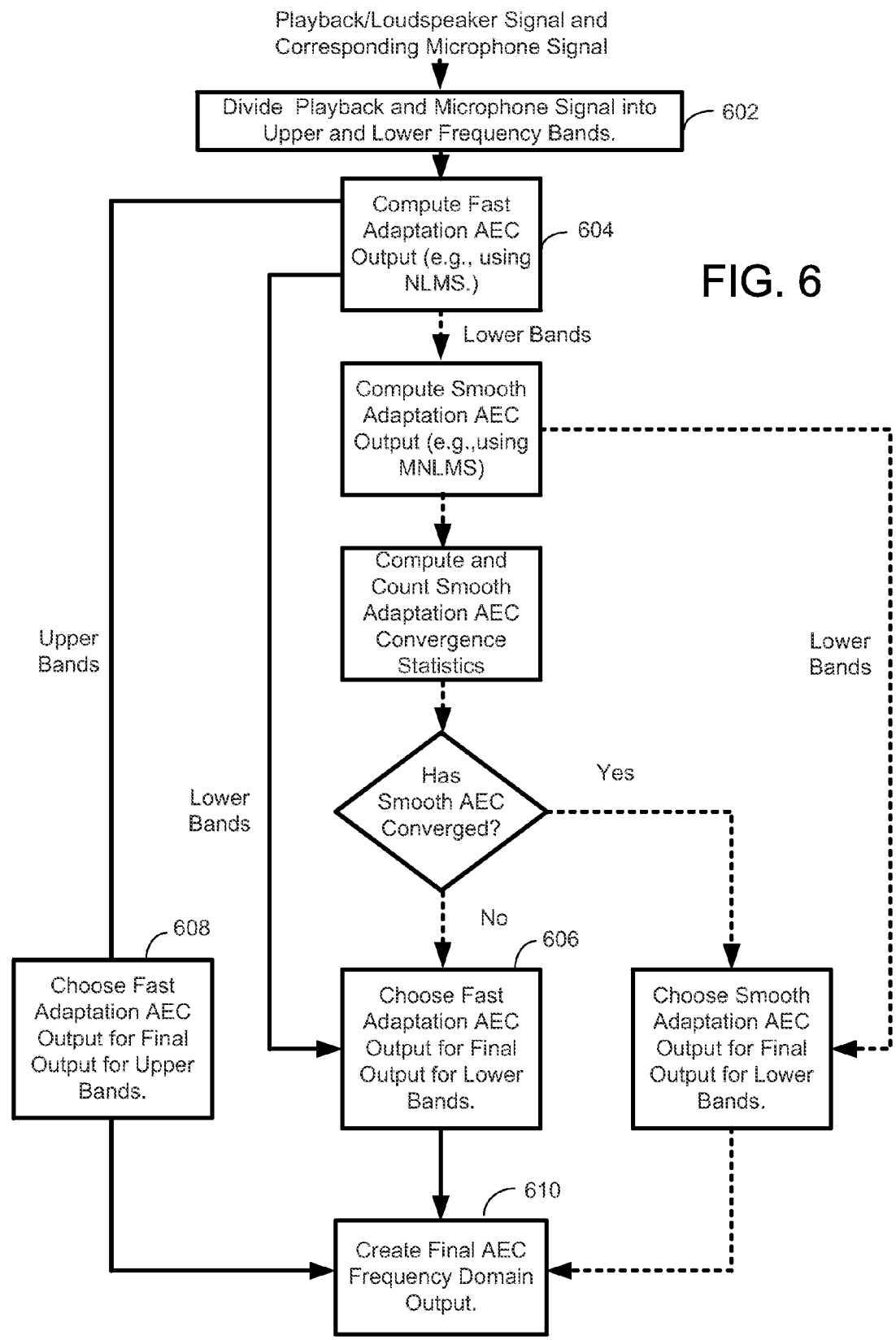
FIG. 6 depicts an exemplary flow diagram showing a possible process for employing the dual-structured acoustic echo cancellation architecture shown in FIG. 6.
Figure 7:
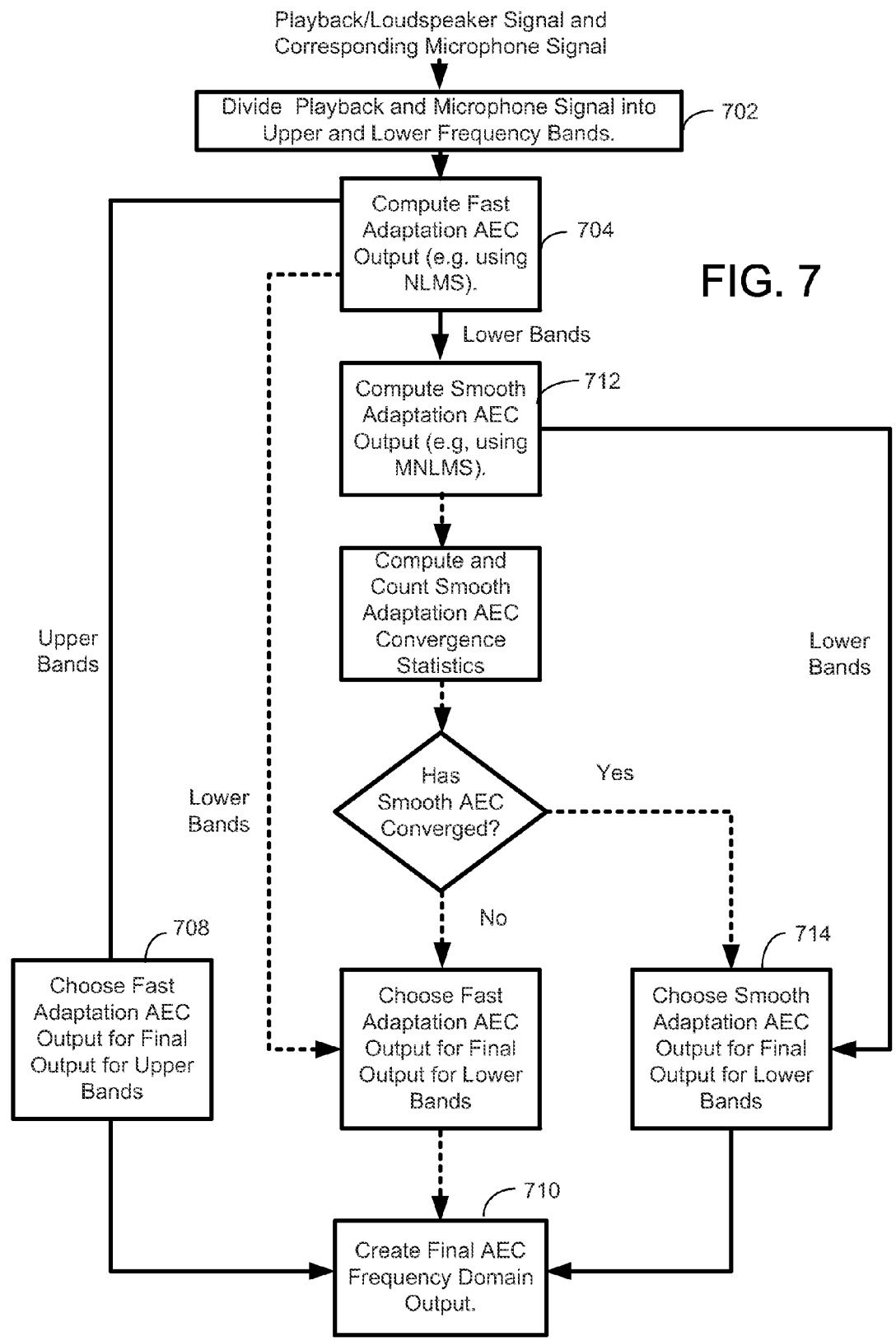
FIG. 7 depicts another exemplary flow diagram showing another embodiment for employing the dual-structured acoustic echo cancellation architecture shown in FIG. 5.
Figure 8:
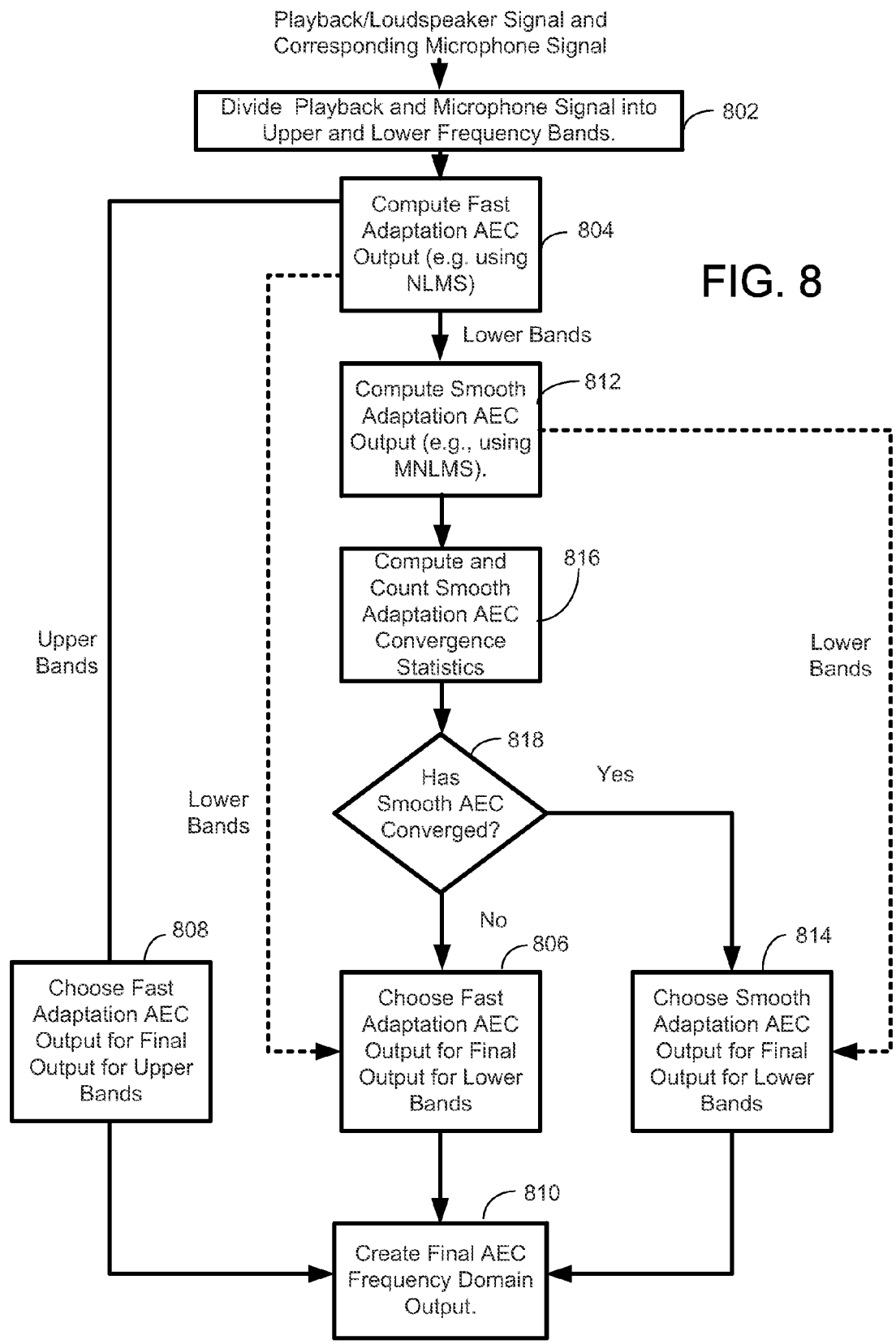
FIG. 8 depicts yet another exemplary flow diagram showing yet another embodiment for employing the dual-structured acoustic echo cancellation architecture shown in FIG. 5.

FIGS. 6, 7 and 8 are flow diagrams illustrating possible variations in processing using the dual-structured fast/smooth adaptive acoustic echo cancellation embodiment shown in FIG. 5. The dotted lines indicate possible variations of the process. These flow diagrams assume that the playback and microphone signals have been converted into the frequency domain.

In FIG. 6, a flow diagram illustrating one possible process using the architecture of FIG. 5 is shown. In this embodiment, a playback and corresponding microphone signal are input in the frequency domain. The playback and corresponding microphone signals are divided into upper and lower frequency bands, as shown in process action 602. For example, the frequency domain can be defined as 280 frequency bands, where bands 3-82 are the low frequency bands, and bands 83-282 are the high bands. In this example, bands 1 and 2 are set to zero in order to filter out low frequency noise. For both the upper and lower frequency bands, the fast adaptation acoustic echo cancellation output is computed, preferably using the NLMS algorithm, as shown in process action 604. In this embodiment, the output of the fast adaptation acoustic echo cancellation for the upper frequency bands and the output of the fast adaptation acoustic echo cancellation for the lower frequency bands are chosen (process actions 606, 608) and combined to create the final acoustic echo cancellation output in the frequency domain (process action 610). Optionally, the final acoustic echo cancellation output can be converted to the time domain using an inverse frequency domain transform. In this embodiment both the upper and lower frequency bands are preferably processed with the NLMS adaptive algorithm.

Alternately, however, in another embodiment, shown in FIG. 7, whose initial actions are the same as that of FIG. 6, for both the upper and lower frequency bands, the fast adaptation acoustic echo cancellation output is computed, again preferably using the NLMS algorithm, as shown in process actions 702, 704. In this embodiment, the output of the fast adaptation acoustic echo cancellation is chosen for the upper frequency bands (process action 708) in creating the final acoustic echo cancellation in the frequency domain (process action 710). For the lower frequency bands, the smooth adaptation acoustic echo cancellation output is computed, preferably using the MNLNS algorithm (process action 712), and is chosen for the lower bands (process action 714) in creating the final acoustic echo cancellation output in the frequency domain (process action 710). This embodiment is advantageous in that it quickly converges the adaptation algorithm for the upper frequency bands where the echo is less perceptible, but more smoothly converges the adaptation algorithm at the lower frequencies where misadjustment is more audible.

In yet another embodiment, shown in FIG. 8, the playback/loudspeaker signal and corresponding microphone signal (capture data) are input and broken into upper and lower bands (process action 802). The fast adaptation acoustic echo cancellation output is computed for the upper bands, preferably using the NLMS algorithm (process action 804), and chosen to create the final acoustic echo cancellation in the frequency domain (process actions 808, 810). The fast adaptation acoustic echo cancellation output is also computed for the lower bands (process action 804) and the smooth adaptation acoustic echo cancellation output is also computed for the lower bands, preferably using the MNLMS algorithm (process action 812). Average cross correlation convergence detection statistics for each subband of the smooth acoustic echo cancellation algorithm are then computed (process action 816) and counted to determine which of the smooth or fast adaptation output for the lower frequency bands should be chosen for creating the final acoustic echo cancellation frequency domain output. If the smooth acoustic echo cancellation has converged, the lower bands of the final output frame are loaded with the smooth acoustic echo cancellation's output, as shown in process actions 818, 814 and 810. If the smooth acoustic echo cancellation has not converged, the fast acoustic echo cancellation's lower bands are loaded in the final processed frame, as shown in process actions 818, 806 and 810. This embodiment is advantageous in that it chooses between fast and smooth adaptation for the lower frequency bands where misadjustments are more audible while optimizing the adaptation algorithms convergence.

Figure 9:
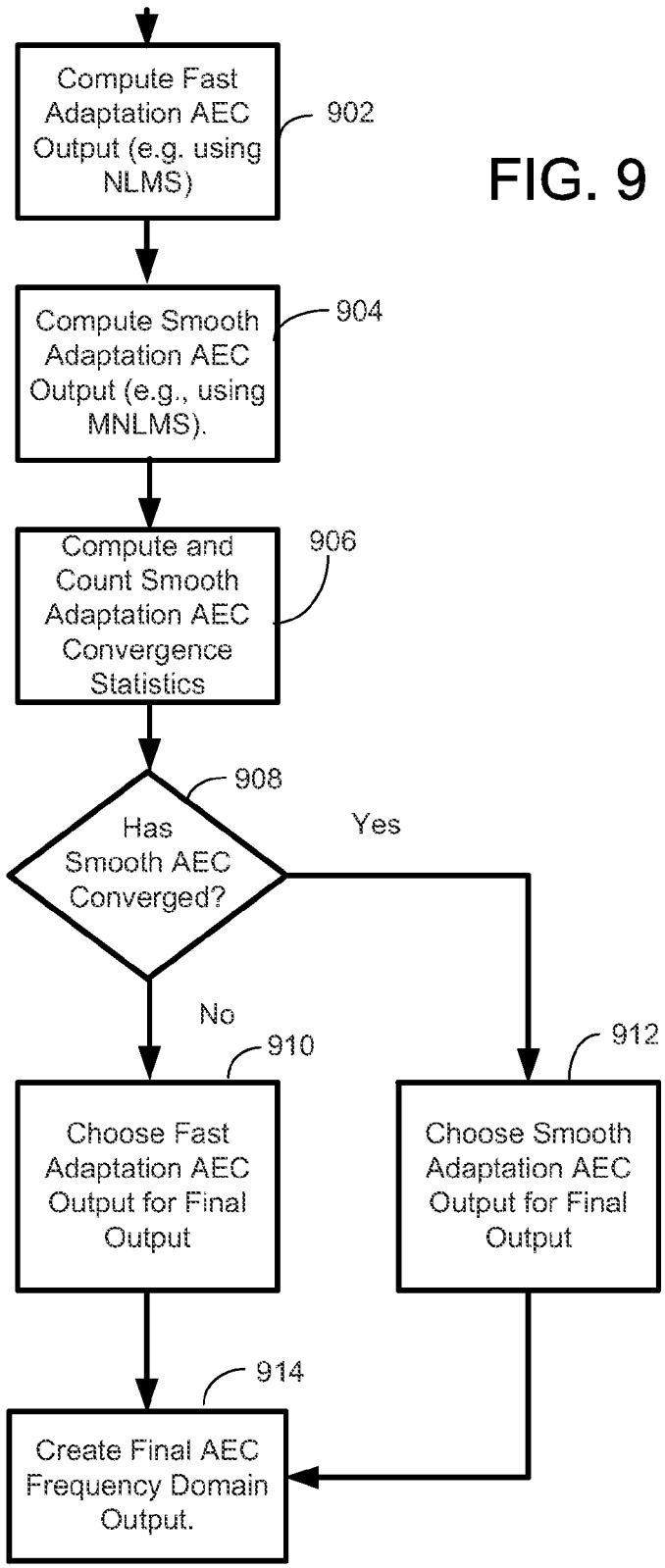
FIG. 9 depicts an exemplary flow diagram showing another embodiment of the adaptive echo cancellation technique wherein the capture and playback data are not split into upper and lower frequency bands.

In another embodiment, the playback and capture data are not divided into upper and lower bands. All bands can be switched between fast and smooth acoustic echo cancellation outputs. In this embodiment, shown in FIG. 9, the playback signal and corresponding capture signal, both in the frequency domain, are input. The fast adaptation acoustic echo cancellation output is computed, preferably using the NLMS algorithm (process action 904) and then the smooth adaptation acoustic echo cancellation output is also computed, preferably using the MNLMS algorithm (process action 906). Average cross correlation convergence detection statistics for each sub-band of the smooth acoustic echo cancellation algorithm are then computed and counted (process action 908) to determine which of the smooth or fast adaptation output should be chosen for creating the final acoustic echo cancellation frequency domain output. If the smooth acoustic echo cancellation has converged, the final output frame is loaded with the smooth acoustic echo cancellation's output, as shown in process actions 908, 912 and 914. If the smooth acoustic echo cancellation has not converged, the fast acoustic echo cancellation output is loaded in the final processed frame, as shown in process actions 908, 910 and 914.

In the above-discussed embodiments, it is also possible to switch the step size, μ, of the fast acoustic echo cancellation branch (for example, between 0.35 and 0.2) to further increase the convergence speed of the overall system.

An important component of the dual structured architecture is to be able to switch between fast and smooth adaptation depending on the convergence conditions of the acoustic echo cancellation algorithm. To achieve this, the orthogonality property of adaptive algorithms can be used: when the echo canceller has converged, the acoustic echo cancellation output signal must be orthogonal to the speaker signal. Further, instead of operating the convergence detector in the time domain, it is operated in the subband domain; this is explained next. The cross correlation between the acoustic echo cancellation output $E_1(n,m)$ of the lower frequency stream at frame n and the speaker signal at $X(n-i,m)$ at frame $n-i (i=0, \ldots, L-1)$ for frequency bin m, where L denotes the regression model order, is defined as $$\rho^i(n,m) = \frac{P^i_{XE_1}(n,m)}{P^i_X(n,m) P_{E_1}(n,m)} \quad (10)$$

where, $P_{E_1}(n,m)$, an estimate of the power spectral density for the acoustic echo cancellation output, $P_X^i(n,m)$, an estimate of the power spectral density for the speaker signal, and $P_{XE_1}^i(n,m)$, the cross power spectral density between the acoustic echo cancellation output and the speaker signal, are updated using an exponential weighting recursive algorithm:

$$P_{E_1}^2(n,m) = \lambda P_{E_1}^2(n-1,m) + (1-\lambda)|E_1(n,m)|^2 \quad (11)$$

$$|P_X^i(n,m)|^2 = \lambda |P_X^i(n-1,m)|^2 + (1-\lambda)|X(n-i,m)|^2 \quad (12)$$

$$P_{XE_1}^i(n,m) = \lambda P_{XE_1}^i(n-1,m) + (1-\lambda) \cdot X(n-i,m) E_1^H(n,m) \quad (13)$$

Here, λ is an exponential weighting factor. In one embodiment λ is generally set as $0.95 < \lambda \leq 1$ for slowly time varying signals. Using equation (10), the average cross correlation (ACC), or smooth adaptation convergence statistic, is defined as $$\bar{\rho}(n,m) = \frac{1}{L} \sum_{i=0}^{L-1} |\rho^i(n,m)|. \quad (14)$$

For reliable convergence decisions, in one exemplary embodiment, the ACC, or smooth adaptation convergence statistic, is computed only for the frequency bins 13-82 (325 Hz-2.05 KHz) where speech signals are predominantly present. At each frame, $\bar{\rho}(n,m)$, is compared to a threshold $\rho_{Th}$. If the inequality $\bar{\rho}(n,m) \leq \rho_{Th}$ is met for more than half of the total frequency bins considered, it is declared that the smooth acoustic echo canceller has converged, otherwise it is declared that either the smooth acoustic echo canceller has not converged or the echo path has changed. The convergence threshold is typically set to be slightly larger than in its steady state value.

Figure 10:
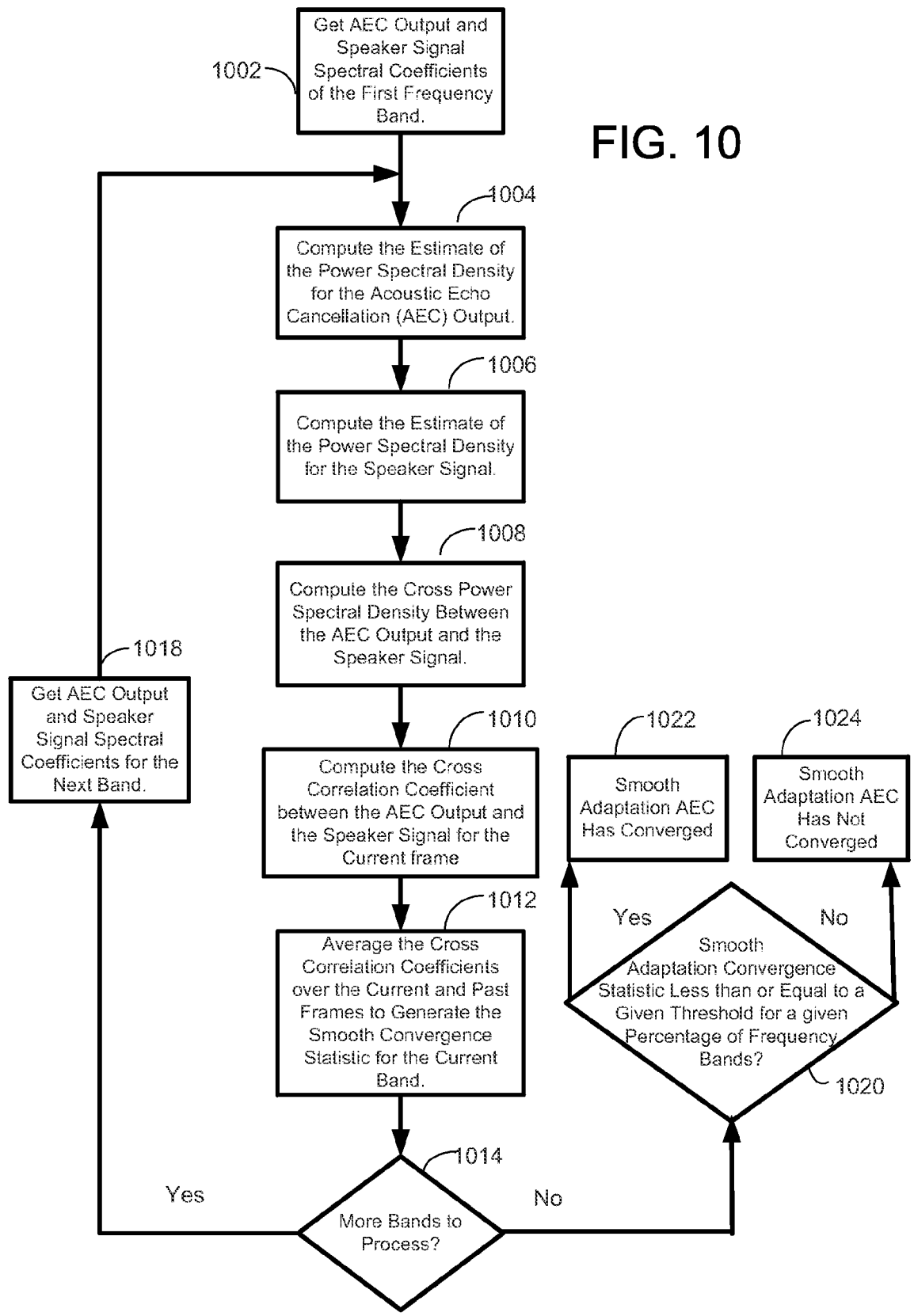
FIG. 10 depicts an exemplary flow diagram for computing a convergence statistic for use in the dual-structured acoustic architecture.

Details of the process of computing the smooth adaptation convergence statistic are shown in FIG. 10. In general, computing the smooth adaptation convergence statistic involves cross-correlating the smooth acoustic echo cancellation output with the speaker signal. More specifically, in one embodiment, the first frequency band of acoustic echo cancellation output and speaker signal spectral coefficients are extracted (process action 1002). An estimate of the power spectral density for the acoustic echo cancellation output is computed (process action 1004) for the first frequency band; this can be done using equation (11). An estimate of the power spectral density for the speaker signal is also calculated (process action 1006) for the first frequency band, which can be computed using equation (12). Then the cross power spectral density between the acoustic echo cancellation output and the speaker signal is computed for the first frequency band, which can be computed using equation (13), as shown in process action 1008. The cross correlation coefficient between the acoustic echo cancellation output and the speaker signal of the current frame are computed for the first frequency band, which can be computed using equation (10) above, as shown in process action 1010. The cross correlation coefficient over the current and past frames are averaged to generate the average cross correlation coefficient, or smooth adaptation convergence statistic for the first frequency band, as shown in process action 1012, preferably using equation (14). A check is made to see if there are more frequency bands to process (process action 1014). If there are more bands to process, the acoustic echo cancellation output and the speaker signal spectral coefficients are obtained 1018 and the process continues for the remaining frequency bands. In one embodiment, once all frequency bands are processed, the smooth adaptation convergence statistic (the average cross-correlation coefficient) for each band is compared to a threshold, as shown in process action 1020. In this embodiment, if the smooth adaptation convergence statistic is less than or equal to the threshold for more than half of the total frequency bands considered, it is declared that the smooth acoustic echo canceller has converged (process action 1022), otherwise it is declared that the smooth acoustic echo canceller has not converged (process action 1024).

It should be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for canceling an acoustic echo, comprising using a computer to perform the process actions of:

converting received playback data and corresponding capture data into the frequency domain;

processing the playback data and capture data in the frequency domain simultaneously through each of a plurality of acoustic echo cancellation filters which use different adaptation techniques to cancel an echo thereby creating a plurality of fast adaptation and smooth adaptation acoustic echo cancellation outputs; and combining the acoustic echo cancellation outputs of the plurality of acoustic echo cancellation filters to produce a final echo-cancelled output in the frequency domain.

2. The computer-implemented process of claim 1, further comprising the process action of:
  converting the final echo-cancelled output in the frequency domain into the time domain, to produce processed near-end speech.

3. The computer-implemented process of claim 1 wherein the plurality of different adaptation techniques use different parameters in attempting to achieve convergence of adaptive acoustic echo cancellation filter algorithms.

4. The computer-implemented process of claim 3 wherein the different parameters comprise at least one of:
  convergence algorithm step size,
  number of taps,
  regularization constant, and
  forgetting factor.

5. The computer-implemented process of claim 1 wherein processing the playback data and capture data with a plurality of acoustic echo cancellation filters which use different adaptation techniques, comprises the process actions of:
  (a) dividing the playback data and the capture data into upper and lower frequency bands;
  (b) for the upper frequency bands of the playback data and capture data,
    computing a fast adaptation acoustic echo cancellation output,
    choosing the fast adaptation acoustic echo cancellation output as the acoustic echo cancellation output for the upper frequency bands; and
  (c) for the lower frequency bands of the playback data and capture data,
    computing a smooth adaptation acoustic echo cancellation output;
    computing a fast adaptation acoustic echo cancellation output;
    computing smooth adaptation acoustic echo cancellation convergence statistics;
    using the smooth adaptation convergence statistics to determine if the smooth adaptation acoustic echo cancellation output has converged;
    if the smooth adaptation acoustic echo cancellation output has converged, choosing the slow adaptation acoustic echo cancellation output as the acoustic echo cancellation output for the lower frequency bands;
    if the smooth adaptation acoustic echo cancellation output has not converged, choosing the fast adaptation acoustic echo cancellation output as the acoustic echo cancellation output for the lower frequency bands.

6. The computer-implemented process of claim 5 wherein each fast adaptation acoustic echo cancellation output is computed using a Normalized Least Mean Squares (NLMS) procedure.

7. The computer-implemented process of claim 5 wherein each smooth adaptation acoustic echo cancellation output is computed using a Momentum Normalized Least Mean Squares (MNLMS) procedure using a negative momentum term.

8. The computer-implemented process of claim 5 wherein each fast adaptation acoustic echo cancellation output is computed using one of:
  a Least Mean Squares (LMS) procedure;
  a Recursive Least Squares (RLS) procedure;
  a Fast Recursive Least Squares (FRLS) procedure; or
  a Momentum Normalized Least Mean Squares (MNLMS) procedure using a positive momentum term.

9. The computer-implemented process of claim 5 wherein computing smooth adaptation acoustic echo cancellation convergence statistics comprises cross-correlating the smooth adaptation acoustic echo cancellation output with the playback data.

10. The computer-implemented process of claim 9 wherein the process action for computing smooth adaptation convergence statistics comprises the process actions of:
  receiving a smooth adaptation acoustic echo cancellation output and playback data spectral coefficients of a first frequency band;
  for the first and remaining frequency bands,
    computing an estimate of power spectral density for the smooth adaptation acoustic echo cancellation output;
    computing an estimate of the power spectral density for the playback data;
    computing a cross-power spectral density between the smooth adaptation acoustic echo cancellation output and the playback data;
    computing cross-correlation coefficients between the smooth adaptation acoustic echo cancellation output and the playback data for a current playback frame;
    averaging the cross-correlation coefficients over the current frame and past frames to generate an average cross-correlation coefficient; and
    using the average cross-correlation coefficient as the smooth adaptation acoustic echo cancellation convergence statistic in determining whether the smooth adaptation acoustic echo cancellation output has converged.

11. The process of claim 10, wherein the process action of using the average cross-correlation coefficient as the smooth adaptation acoustic echo cancellation convergence statistic in determining whether the smooth adaptation acoustic echo cancellation output has converged, comprises:
  comparing the average cross-correlation coefficient to a threshold; and
  if the average cross-correlation coefficient is less than or equal to the threshold for more than half of the frequency bands, determining that the smooth acoustic echo cancellation output has converged;
  if the average cross-correlation coefficient is not less than or equal to the threshold for more than half of the frequency bands, determining that the smooth acoustic echo cancellation output has not converged.

12. The computer-implemented process of claim 1 wherein processing the playback data and capture data with a plurality of acoustic echo cancellation filters which use different adaptation techniques, comprises the process actions of:
  (a) dividing the playback data and capture data into upper and lower frequency bands;
  (b) for the upper frequency bands of the playback data and capture data,
    computing a fast adaptation acoustic echo cancellation output using a normalized least mean square procedure,
    choosing the fast adaptation acoustic echo cancellation output as the output for the upper frequency bands; and
  (c) for the lower frequency bands of the playback data and capture data,
    computing a fast adaptation acoustic echo cancellation output using a normalized least mean square procedure,
    choosing the fast adaptation acoustic echo cancellation output as the output for the lower frequency bands.

13. The computer-implemented process of claim 10 wherein computing a fast adaptation acoustic echo cancellation output using a normalized least mean square procedure, includes using different step sizes to speed convergence of the fast adaptation acoustic echo cancellation output.

14. The computer-implemented process of claim 1 wherein processing the playback data and capture data with a plurality of acoustic echo cancellation filters which use different adaptation techniques, comprises the process actions of:
   (a) dividing the playback data and capture data into upper and lower frequency bands;
   (b) for the upper frequency bands of the playback data and capture data,
      computing a fast adaptation acoustic echo cancellation output using a normalized least mean square procedure,
      choosing the fast adaptation acoustic echo cancellation output as the acoustic echo cancellation output for the upper bands; and
   (c) for the lower frequency bands of the playback data and capture data,
      computing a smooth adaptation acoustic echo cancellation output using a momentum normalized least mean square procedure;
      choosing the smooth adaptation acoustic echo cancellation output as the acoustic echo cancellation output for the lower bands.

15. The computer-implemented process of claim 1 wherein processing the playback data and capture data with a plurality of acoustic echo cancellation filters which use different adaptation techniques, comprises the process actions of:
   computing a smooth adaptation acoustic echo cancellation output;
   computing a fast adaptation acoustic echo cancellation output;
   computing smooth adaptation acoustic echo cancellation convergence statistics;
   using the smooth adaptation convergence statistics to determine if the smooth adaptation acoustic echo cancellation output has converged;
   if the smooth adaptation acoustic echo cancellation output has converged, choosing the slow adaptation acoustic echo cancellation output as the final acoustic echo cancellation output;
   if the smooth adaptation acoustic echo cancellation output has not converged, choosing the fast adaptation acoustic echo cancellation output as the final acoustic echo cancellation output.

16. A system for canceling an estimated echo, comprising:
   a general purpose computing device;
   a computer program comprising program modules executable by the general purpose computing device, wherein the computing device is directed by the program modules of the computer program to,
      input a playback signal into a first linear transform module which converts the playback signal which is originally in the time domain, into the frequency domain;
      input a capture signal into a second linear transform module which converts the capture signal which is originally in the time domain, into the frequency domain;
      input the converted playback signal and the converted capture data in the frequency domain simultaneously into each of a plurality of adaptive acoustic echo cancellation filters, which use different adaptation techniques, and output corresponding resulting fast adaptation and smooth adaptation echo cancelled signals in the frequency domain;
      for each frequency, compute a linear combination of the resulting echo cancelled signals in the frequency domain in a linear combination module;
      compute processed near-end speech with an echo cancelled by combining the linear combinations for each frequency in an inverse transform module.

17. The system of claim 16 wherein the plurality of different adaptation techniques comprise a combination of two or more of:
   a Least Mean Squares (LMS) procedure,
   a Normalized Least Mean Squares (NLMS) procedure,
   a Recursive Least Squares (RLS) procedure,
   a Fast Recursive Least Squares (FRLS) procedure, and
   a Momentum Normalized Least Mean Squares (MNLMS) procedure.

18. The system of claim 16 wherein the plurality of different adaptation techniques vary at least one of:
   adaptation algorithm step size,
   number of taps,
   regularization constant, and
   forgetting factor.

19. A system for canceling an acoustic echo, comprising:
   a general purpose computing device;
   a computer program comprising program modules executable by the general purpose computing device, wherein the computing device is directed by the program modules of the computer program to,
   (a) receive a captured data signal and a corresponding playback data signal in the frequency domain;
   (b) for the upper frequency bands of the capture data signal and playback data signal,
      compute a fast adaptation acoustic echo cancellation output for the upper frequency bands;
      choose the fast adaptation acoustic echo cancellation output as the final acoustic echo cancellation output for the upper frequency bands; and
   (c) for the lower frequency bands of the capture data signal and playback data signal,
      compute a fast adaptation acoustic echo cancellation output;
      compute a smooth adaptation acoustic echo cancellation output using a momentum normalized least mean squares procedure (MNLMS);
      use a conversion detector to determine if the smooth adaptation acoustic echo cancellation output has converged;
      if the smooth adaptation acoustic echo cancellation output has converged choose the smooth adaptation acoustic echo cancellation output for the final acoustic echo cancellation output for the lower frequency bands;
      if the smooth adaptation acoustic echo cancellation output has not converged choose the fast adaptation acoustic echo cancellation output for the final acoustic echo cancellation output for the lower frequency bands; and
   (d) combine the final acoustic echo cancellation output for the high frequency bands with the final acoustic echo cancellation output for the low frequency bands to create a total final acoustic echo cancellation output for both the upper and lower frequency bands.

20. The system of claim 19 wherein each fast adaptation acoustic echo cancellation output is computed using one of:
   a Least Mean Squares (LMS) procedure;
   a Recursive Least Squares (RLS) procedure;
   a Fast Recursive Least Squares (FRLS) procedure; and
   a Momentum Normalized Least Mean Squares (MNLMS) procedure using a positive momentum term.

* * * * *